United States Patent [19]

Murphy et al.

[11] Patent Number: 4,988,574
[45] Date of Patent: Jan. 29, 1991

[54] THERMOPLASTIC POLYURETHANES HAVING IMPROVED BINDER PROPERTIES FOR MAGNETIC MEDIA RECORDING

[75] Inventors: Walter T. Murphy, Cuyahoga Falls; Hsiungto S. Tseng, Westlake; Edmond G. Kolycheck, Lorain, all of Ohio

[73] Assignee: The BFGoodrich Company, Akron, Ohio

[21] Appl. No.: 308,061

[22] Filed: Feb. 8, 1989

[51] Int. Cl.$^5$ .............................................. G11B 5/00
[52] U.S. Cl. .................. 428/425.9; 428/900; 428/694
[58] Field of Search ............... 428/900, 694, 425.9

[56] References Cited

U.S. PATENT DOCUMENTS

| | | | |
|---|---|---|---|
| 3,493,634 | 2/1970 | Kolycheck et al. | 260/858 |
| 3,951,919 | 4/1976 | Pinfold et al. | 260/75 NK |
| 4,442,282 | 4/1984 | Kolycheck | 528/83 |
| 4,568,611 | 4/1986 | Amirsakis et al. | 428/425.9 |
| 4,643,949 | 2/1987 | Kolycheck et al. | 428/425.9 |
| 4,775,593 | 10/1988 | Heberger et al. | 428/411.1 |
| 4,842,942 | 6/1989 | Yatsuka et al. | 428/425.9 |

Primary Examiner—George F. Lesmes
Assistant Examiner—Stevan A. Resan
Attorney, Agent, or Firm—Daniel J. Hudak

[57] ABSTRACT

A magnetic recording tape, as for audio apparatus, video apparatus, or computers, has a binder containing magnetic particles therein bonding the magnetic particles to the substrate. The binder comprises the reaction product of a polyisocyanate and a blend of a hydroxyl terminated polyester intermediate and a derivative of a bis-phenol A chain extender having the formula

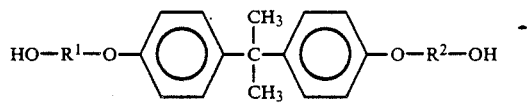

where $R^1$ and $R^2$, independently, is an alkylene having from 2 to 4 carbon atoms, with 2 carbon atoms, that is, ethylene, being preferred.

18 Claims, No Drawings

THERMOPLASTIC POLYURETHANES HAVING IMPROVED BINDER PROPERTIES FOR MAGNETIC MEDIA RECORDING

FIELD OF THE INVENTION

The present invention relates to magnetic tapes having a magnetic recording media thereon contained in a polyesterurethane resin binder which is made from the reaction product of a polyisocyanate and a blend of a polyester intermediate and a derivative of a bis-phenol A chain extender.

BACKGROUND

Heretofore, magnetic recording tapes have been made and utilized in various applications such as audio, video, computers, and the like. Although suitable in various instances, such magnetic recording tapes lack high tensile strength, good solubility in weak solvent systems as in ketones, e.g., methyl ethyl ketone, and good dispersibility of the magnetic particles within the polymer.

U.S. Pat. No. 4,643,949 to Kolycheck relates to magnetic recording tapes wherein a binder containing magnetic particles therein is the reaction product of a diisocyanate and a blend of a hydroxyl terminated polycarbonate and a chain extender. No disclosure of a bisphenol A type chain extender is set forth.

SUMMARY OF THE INVENTION

A magnetic tape binder containing magnetic particles therein such as iron oxide, cobalt modified iron oxide, chromium oxide, and the like, is made from a blend of a hydroxyl terminated polyester intermediate such as poly(tetramethylene adipate glycol) and a specific type of chain extender, that is a derivative of bis-phenol A, which are reacted with a polyisocyanate. The binder permits good dispersibility of the magnetic particles therein and has good solubility in weak solvents such as various ketones.

DETAILED DESCRIPTION OF THE INVENTION

The magnetic recording tapes of the present invention contain a suitable substrate usually in the form of a film having good tensile strength and a binder coating at least on one side thereof containing a polyesterurethane resin having magnetic particles therein. The substrate can generally be made out of any material known to the art as well as to the literature such as polyester, and the like. The polyesterurethane resin generally encapsulates as well as binds the magnetic particles to the substrate. The magnetic particles can be any type known to the art and to the literature with preferred types of particles including gamma ferric oxide, i.e., $Fe_2O_3$, cobalt modified $Fe_2O_3$, chromium oxide, i.e., $CrO_2$, metal particles, barium ferrite, and the like. The particle size of the magnetic particles is generally less than 1.0 micron and preferably 0.5 micron or less. The amount of the magnetic particles is generally from about 60 percent to about 85 percent by weight based upon the total weight of the particles and the polyesterurethane resin. Typically for audio use, the amount of particles is generally from about 65 percent to about 75 percent by weight, for video use the amount of the particles is generally from about 70 percent to about 80 percent by weight, and for computer use the amount of magnetic particles is generally from about 75 to about 80 percent by weight.

The polyesterurethane resin of the present invention is prepared by reacting a polyisocyanate with a blend of a hydroxyl terminated polyester intermediate and a derivative of a bis-phenol A type chain extender.

The hydroxyl terminated polyester intermediate is generally a linear polyester having a weight average molecular weight of from about 500 to about 5,000 and preferably from about 700 to about 2,000 and an acid number of generally less than 1.3 and preferably less than 1.0. The polyester is prepared in any conventional manner as by an esterification reaction of a dicarboxylic acid or an anhydride thereof with a glycol. Mole ratios generally in excess of more than one mole of glycol to acid are preferred so as to obtain linear chains having a preponderance of terminal hydroxyl groups thereon. Desirably, the acids are dicarboxylic acids or anhydrides thereof wherein the hydrocarbon portion (i.e. the noncarboxyl portion or anhydride portion) is an aliphatic such as an alkylene group having from 2 to 18 carbon atoms with 4 carbon atoms being preferred, or an aromatic, or an aliphatic (preferably an alkyl) substituted aromatic having from 6 to 15 carbon atoms. Hence, adipic acid is the preferred acid. Examples of other suitable acids include succinic acid, pimelic acid, suberic acid, azelaic acid, sebacic acid, 1,12-dodecanedioic acid, isophthalic acid, and the like. The glycols which are utilized preferably contain a total of from 4 to 10 carbon atoms with butane diol and specifically 1,4-butane diol being preferred. Examples of other suitable glycols include pentamethylenediol, hexamethylenediol, octamethylenediol, 1-4-cyclohexane dimethanol, and the like. A preferred polyester intermediate is thus poly(tetramethylene adipate glycol).

The polyisocyanates which are utilized are generally diisocyanates such as an aliphatic diisocyanate having from 2 to 12 carbon atoms, or an aromatic or an aliphatic substituted aromatic or an aromatic substituted aliphatic, etc., diisocyanate having a total of from 6 to 18 carbon atoms. Examples of specific diisocyanates include various aliphatic diisocyanates such as tetramethylene diisocyanate, various cycloaliphatic diisocyanates such as cyclohexyl diisocyanate, and the like. Examples of aromatic substituted aliphatics or aliphatic substituted aromatic diisocyanates include the various phenyl diisocyanates, the various toluene diisocyanates, the various diaryl diisocyanates such as 4,4'-diphenylmethane diisocyanate, a preferred diisocyanate known as MDI, dichloro-diphenylmethane diisocyanate, dimethyl diphenylmethane diisocyanate, diphenyl dimethylmethane diisocyanate, dibenzyl diisocyanate, diphenyl ether diisocyanate, and the like. The number of moles of the polyisocyanate which is utilized is desirably substantially equal to the sum total of the number of moles of the hydroxyl terminated polyester and the chain extender. Hence, the polyester urethane resin formed is essentially free of NCO (isocyanate) groups. Generally, the number of moles of polyisocyanate per total number of moles of the hydroxyl terminated polyester and the chain extender is from about 0.95 to about 1.01, and preferably from about 0.97 to about 1.005.

The chain extenders of the present invention are of a specific type in order to provide good solubility of the binder in weak solvents as well as good dispersibility of the magnetic particles in the polyesterurethane resin. Specifically, the chain extender is a derivative of bis-phenol A and can be represented by the formula

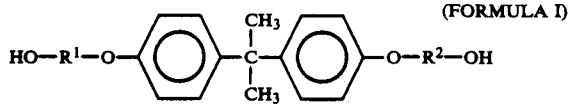

(FORMULA I)

where $R^1$ and $R^2$, independently, is an alkylene having from 2 to 4 carbon atoms, with 2 carbon atoms, that is, ethylene, being preferred.

The amount of the chain extender is generally from about 0.1 to about 10 moles and desirably from about 0.5 to about 5 moles, and more preferably from about 0.4 to about 1.7 for every mole of the hydroxyl terminated polyester intermediate. As previously noted, a blend of the hydroxyl terminated polyester intermediate and the chain extender are utilized and reacted with the polyisocyanate.

The polyesterurethane resin of the present invention is, as noted above, the reaction product of one or more of the above-noted polyisocyanates with a blend of one or more of the above-noted hydroxyl terminated polyester intermediates and one or more of the above-noted chain extenders. The reaction temperature is generally at least 100° C. and up to about 150° C. A random copolymerization reaction occurs and yields a polyesterurethane resin which is found to be highly suitable for incorporation of magnetic particles therein and for binding to a substrate to form a magnetic tape.

In addition to the magnetic particles and the polyester resin, other conventional additives can be utilized in forming the binder material. For example, various wetting agents can be utilized in an amount of from about 1 to about 5 parts by weight for every 100 parts by weight of the polyesterurethane resin and magnetic particles. Numerous wetting agents can be utilized and specific examples include soya lecithin, zinc naphthalene, synthetic sperm oils, mono-, di-, and triesters of oleic acid, triethanolamine, lignin sulfonic acid, dioctyl sulfosuccinate, and the like. Various lubricants in the amount of from about 1 to about 5 parts by weight per 100 parts by weight of the resin and magnetic particles can be utilized with suitable examples including various silicones such as fluorinated hydrocarbon oils, long chain fatty acids, stearates of calcium, lithium, and magnesium, and the like. Suitable crosslinking agents in the amount of from about 1 to about 5 parts by weight per 100 parts by weight of the blend of resin and magnetic particles can be utilized such as MONDUR CB-75 (polyisocyanate product manufactured by Mobay Chemicals), and abrasives such as aluminum oxide, and the like. Carbon black can also be utilized in effective amounts to improve the conductivity of the magnetic tape.

The magnetic tape, as noted above, comprises a substrate, desirably a flexible substrate, and a coating of magnetic particles on the substrate contained in a binder for adhering the magnetic particles to the substrate. The substrate can typically be polyethylene terephthalate of a suitable thickness although other flexible thermoplastic substrates can also be utilized. The tape can be made by admixing magnetic particles with a solvent solution of the binder and the designated additives to make a magnetic dispersion, coating the magnetic dispersion-binder onto the flexible substrate and removing the solvent therefrom to form an adherent coating of magnetic particles on the substrate. In other words, the magnetic particles are bound to the substrate by the polyesterurethane resin. Suitable solvents include polar solvents such as ketones, and the like, with specific examples including tetrahydrofuran, cyclohexanone, and the like. According to the present invention, various diluents can be utilized in association with the solvents such as toluene, xylene, methylisobutylketone, and the like.

Another unexpected property of the present invention is that the polyesterurethane resin of the present invention results in good dispersibility of the magnetic particles when the same are mixed therein.

That better dispersibility is obtained is readily set forth in the following examples.

EXAMPLES

EXAMPLE 1

One mole of poly(tetramethyleneadipate) glycol having a molecular weight 850 was blended at 65° C. with 1.26 moles of Dianol 22, manufactured by Akzo Chemical, a chain extender of Formula I wherein $R^1$ and $R^2$ are ethylene. This blend or physical mixture was reacted with 2.26 moles of methylene bis diphenyl diisocyanate (MDI) by standard high temperature random melt polymerization procedure. This procedure involved heating the polyester/Dianol and MDI separately to about 100° C. and then mixing the ingredients. The reactor is exothermic and raises the temperature to about 200° C. to 250° C. in about 1 to 6 minutes during which time polymerization takes place as evidenced by an increase in viscosity. The resulting polyesterurethane resin had a viscosity of 300–400 cps when measured as a 15% solution in methyl ethyl ketone. The glass transition temperature of the polymer was 38° C. when measured by DSC as a second heating cycle.

EXAMPLE 2

Example 2 was prepared in a manner identical to Example 1 except that 0.88 moles of Dianol 22 was utilized and that 1.88 moles MDI was utilized. The resulting polyesterurethane had a viscosity of 200–400 cps when measured as a 15% solution in methyl ethyl ketone. The glass transition temperature of the polymer was 19° C. when measured by DSC as a second heating cycle.

EXAMPLE 3

Audio Tape

| FORMULATION FOR AUDIO TAPE | PARTS BY WT. |
|---|---|
| Magnetic Oxide, Pfizer 2228H (Manufactured by Pfizer) | 77.0 |
| Dispersant | 2.5 |
| Polyurethane/Example 1 | 17 |
| Vinyl chloride-vinyl acetate-vinyl alcohol copolymer (VAGH manufactured by Union Carbide Corporation) | 3 |
| Lubricant | 0.5 |
| THF/Cyclohexanone 50/50 Mixture | Solvent |

The above composition was mixed utilizing the polyurethane resin of the present invention made in a manner as set forth in Example 1. The mixture was dispersed in a two stage milling process to determine dispersibility of the magnetic oxides. The final mixture was coated (in a thickness of 5 μm) on the polyethylene terephthalate substrate of 12.5 μm thickness and dried. The film thereby obtained was examined for surface reflection and magnetic properties.

EXAMPLE 4

Audio Tape

An audio tape coating was prepared in the same manner as set forth in Example 3 except that the polyurethane resin utilized was made in a manner as set forth in Example 2.

EXAMPLE 5

Audio Tape

An audio tape coating was prepared in the same manner as set forth in Example 3 except that the polyurethane resin utilized was set forth in ESTANE 5701, manufactured by B. F. Goodrich. This audio tape coating was to be used as a dispersibility reference.

EXAMPLE 6

Video Tape

| FORMULATION FOR VIDEO TAPE | PARTS BY WT. |
| --- | --- |
| Magnetic Oxide, Pfizer 3070 (Manufactured by Pfizer) | 80 |
| Abrasive ($Al_2O_3$) | 1.5 |
| Dispersant | 2.0 |
| Carbon Black (10 m $\mu$m) | 1.5 |
| Polyurethane/Example 1 | 11 |
| VAGH | 3 |
| Lubricant | 1.0 |
| THF/Cyclohexanone 50/50 Mixture | Solvent |

The above composition was mixed utilizing the polyurethane resin of the present invention made in a manner as set forth in Example 1. The mixture was dispersed in a two stage milling process to determine dispersibility of the magnetic oxides. The final mixture was coated in a thickness of 5 $\mu$m on the polyethylene terephthalate substrate of 12.5 $\mu$m thickness and dried. The film thereby obtained was examined for surface reflectance and magnetic properties.

EXAMPLE 7

Video Tape

A video tape coating was prepared in the same manner as set forth in Example 6 except that the polyurethane resin utilized was made in a manner as set forth in Example 2.

EXAMPLE 8

Video Tape

A video tape coating was prepared in the same manner as set forth in Example 6 except that the polyurethane resin utilized was ESTANE 5701, manufactured by B. F. Goodrich. This video tape coating was to be used as a dispersibility reference.

EXAMPLE 9

Computer Tape

| FORMULATION FOR COMPUTER TAPE | PARTS BY WT. |
| --- | --- |
| Magnetic Oxide, Pfizer 2228 (Manufactured by Pfizer) | 75 |
| Abrasive ($Al_2O_3$) | 2 |
| Dispersant | 3 |
| Carbon Black (30 m $\mu$m) | 2 |
| Polyurethane Resin/Example 1 | 13 |
| VAGH | 3 |
| Lubricant | 1 |
| THF/Cyclohexanone 50/50 Mixture | Solvent |

The above composition was mixed utilizing the polyurethane resin of the present invention made in a manner as set forth in Example 1. The mixture was dispersed in a two stage milling process to determine dispersibility of the magnetic oxides. The final mix was coated in a thickness of 5 $\mu$m on the polyethylene terephthalate substrate of 12.5 $\mu$m thickness and dried. The film thereby obtained was examined for surface reflection and magnetic properties.

EXAMPLE 10

Computer Tape

A computer tape coating was prepared in the same manner as set forth in Example 9 except that the polyurethane resin utilized was made in a manner as set forth in Example 2.

EXAMPLE 11

Computer Tape

A computer tape coating was prepared in the same manner as set forth in Example 9 except that the polyurethane resin utilized was ESTANE 5701 manufactured by B. F. Goodrich. This computer tape coating was to be used as a dispersibility reference.

Dispersibility characteristics of various tapes obtained in Examples 3 through 11 were measured by surface reflectivity using a Glossmeter and by magnetic properties by a B-H meter. These are standard testing equipment known to the magnetics industry. The results obtained are set forth in Table 1. In each of the audio, the video and the computer tapes, the sample dispersions made with the polyurethane resin of the present invention showed a distinctive advantage over the dispersion made with the commercial polyurethane.

TABLE 1

| APPLICA-TION | EXAMPLE | 60° GLOSS | Magnetic Properties* | | | |
| --- | --- | --- | --- | --- | --- | --- |
| | | | OR | SR | Hc | SFD |
| Audio Tape | Example 3 | 28 | 2.4 | 0.866 | 339 | 0.33 |
| | Example 4 | 31 | 2.4 | 0.870 | 339 | 0.33 |
| | Example 5 (Control) | 21 | 1.1 | 0.62 | 321 | 0.43 |
| Video Tape | Example 6 | 65 | 2.1 | 0.860 | 712 | 0.39 |
| | Example 7 | 69 | 2.2 | 0.864 | 712 | 0.41 |
| | Example 8 (Control) | 60 | 1.8 | 0.825 | 705 | 0.47 |
| Comp. Tape | Example 9 | 55 | 2.2 | 0.829 | 337 | 0.41 |
| | Example 10 | 49 | 1.9 | 0.792 | 349 | 0.44 |
| | Example 11 (Control) | 34 | 1.6 | 0.742 | 346 | 0.54 |

*OR: Orientation Ratio
SR: Squareness
Hc: Coercivity, Oe
SFD: Switching Field Distribution While in accordance with the Patent Statues, the best mode and preferred embodiment has been set forth, the scope of the invention is not limited thereto, but rather by the scope of the attached claims.

What is claimed is:

1. A magnetic tape having good dispersibility of magnetic particles with a polyesterurethane resin binder, comprising:

a substrate, magnetic particles, and a binder bonding said magnetic particles to said substrate, said binder consisting essentially of the reaction product of a polyisocyanate and a blend of hydroxyl terminated polyester intermediate and a derivative of a bisphenol-A chain extender, said polyester intermediate being made from a dicarboxylic acid or an anhydride thereof wherein the hydrocarbon portion is an aliphatic having from 2 to 18 carbon atoms, and from a glycol having a total of from 4 to 10 carbon atoms, said chain extender having the formula

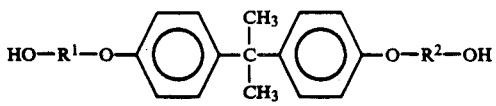

wherein $R^1$ and $R^2$, independently, is an alkylene having from 2 to 4 carbon atoms.

2. A magnetic tape according to claim 1, wherein the amount of said chain extender is from about 0.1 to about 10 moles for every mole of said polyester intermediate.

3. A magnetic tape according to claim 2, wherein said polyisocyanate is an aliphatic diisocyanate having a total of from 2 to 12 carbon atoms, or an aromatic substituted aliphatic, or an aliphatic substituted aromatic diisocyanate having a total of from 6 to 18 carbon atoms, and wherein the weight average molecular weight of said polyester intermediate is from about 500 to about 5,000.

4. A magnetic tape according to claim 3, wherein $R^1$ and $R^2$ of said chain extender is ethylene, and wherein the weight average molecular weight of said polyester intermediate is from about 700 to about 2,000 and wherein said polyester intermediate has an acid number of 1.3 or less.

5. A magnetic tape according to claim 4, wherein the amount of said magnetic particles is from about 60 percent to about 85 percent by weight based upon the total weight of said magnetic particles and said polyesterurethane resin, and wherein said polyester intermediate has an acid number of 1.0 or less.

6. A magnetic tape according to claim 5, wherein the amount of said chain extender is from about 0.5 to about 5 moles for every mole of said polyester intermediate, and wherein said diisocyanate is MDI.

7. A magnetic tape according to claim 6, wherein said polyisocyanate is a diisocyanate, and wherein the number of moles of said diisocyanate is from about 0.95 to about 1.01 per total number of moles of said polyester intermediate and said chain extender.

8. A magnetic tape according to claim 6, wherein said polyester is poly(tetramethylene adipate glycol).

9. A magnetic tape according to claim 8, wherein the amount of said chain extender is from about 0.4 to about 1.7 moles for every mole of said polyester intermediate, and wherein the number of moles of said MDI is from about 0.97 to about 1.005 per total number of moles of said polyester intermediate and said chain extender.

10. A video tape comprising the composition of claim 1.

11. A video tape comprising the composition of claim 4.

12. A video tape comprising the composition of claim 8.

13. An audio tape comprising the composition of claim 1.

14. An audio tape comprising the composition of claim 7.

15. An audio tape comprising the composition of claim 8.

16. A computer tape comprising the composition of claim 1.

17. A computer tape comprising the composition of claim 7.

18. A computer tape comprising the composition of claim 8.

* * * * *